(12) United States Patent
Chabaud (10) Patent No.: US 11,188,693 B2
(45) Date of Patent: Nov. 30, 2021

(54) METHOD FOR MODELING AT LEAST ONE LIGHT SOURCE

(71) Applicant: OPTIS, Toulon (FR)

(72) Inventor: Dominique Chabaud, Carnoules (FR)

(73) Assignee: OPTIS, Toulon (FR)

( * ) Notice: Subject to any disclaimer, the term of this patent is extended or adjusted under 35 U.S.C. 154(b) by 163 days.

(21) Appl. No.: 16/339,718

(22) PCT Filed: Oct. 14, 2016

(86) PCT No.: PCT/EP2016/074788
§ 371 (c)(1),
(2) Date: Apr. 4, 2019

(87) PCT Pub. No.: WO2018/068870
PCT Pub. Date: Apr. 19, 2018

(65) Prior Publication Data
US 2019/0318052 A1    Oct. 17, 2019

(51) Int. Cl.
*G06F 30/20* (2020.01)
*G06F 30/12* (2020.01)
(Continued)

(52) U.S. Cl.
CPC .............. *G06F 30/20* (2020.01); *G06F 30/12* (2020.01); *G06F 2111/20* (2020.01); *G06F 2119/18* (2020.01)

(58) Field of Classification Search
CPC ...... G06F 30/20; G06F 2119/18; G06F 30/12; G06F 30/00; G06F 2111/20
See application file for complete search history.

(56) References Cited

U.S. PATENT DOCUMENTS

2003/0011596 A1   1/2003 Zhang et al.
2009/0021513 A1*  1/2009 Joshi .................... G06T 15/005
                                                      345/419
(Continued)

FOREIGN PATENT DOCUMENTS

WO      2012025145 A1    3/2012

OTHER PUBLICATIONS

Kubiak "Light source modeling for utilization in asymmetric reflector design for even surface llumination". ISBN 978-1-5090-3305-8. Sep. 13-16, 2016. 2016 IEEE. 6 Pages. (Year: 2016).*

(Continued)

*Primary Examiner* — Eunhee Kim
(74) *Attorney, Agent, or Firm* — Womble Bond Dickinson (US) LLP (57) ABSTRACT

The invention relates to a computer-implemented (3) method for modeling at least one light source, comprising: a step of receiving input data (22) comprising data (24) of characteristics of materials forming the light source; and a step of creating, from data (24) of characteristics of the received materials, as well as geometric data (14) and data (26) of characteristics of light emission from the light source, a data model (16) representing the light source, said geometric data (14) describing the light source, and defining a plurality of volumes and surfaces; wherein, during the creation of the data model: the data (24) of characteristics of the materials is linked to the volumes and surfaces of the geometric data (14), and the data (26) of characteristics of light emission from the light source is linked to the surfaces of the geometric data (14); and a step of storing the data model (16) in the computer (3).

15 Claims, 3 Drawing Sheets

(51) Int. Cl.
    *G06F 119/18*     (2020.01)
    *G06F 111/20*     (2020.01)

(56) References Cited

U.S. PATENT DOCUMENTS

2014/0268802 A1*   9/2014  Sun .......................... F21V 29/83
                                                      362/294
2016/0273717 A1*   9/2016  Krames ............. G02F 1/133603

OTHER PUBLICATIONS

Wang et al. "Real-time Volumetric Lighting Using Polygonal Light Volume". 2014 International Conference on Information Science, Electronics and Electrical Engineering. 2014 IEEE. 9 Pages. (Year: 2014).*

Jongewaard. "Guide to selecting the appropriate type of light source model". Proc. SPIE 4775, Modeling and Characterization of Light Sources, (Aug. 16, 2002); doi: 10.1117/12.479656. 14 pages. (Year: 2002).*

Zerhau-Dreihoefer et al. "Light source modeling for automotive lighting devices," Proc. SPIE 4775, Modeling and Characterization of Light Sources, (Aug. 16, 2002); doi: 10.1117/12.479653. 10 pages. (Year: 2002).*

Michael Goesele, et al.: "Accurate light source acquisition and rendering", ACM SIGGRAPH 2003 Papers On, SIGGRAPH '03, Jan. 1, 2003 (Jan. 1, 2003), p. 621, XP055141479, New York, New York, USA DOI: 10.1145/1201775.882316, ISBN: 978-1-58-113709-5.

Henrik Wann Jensen: "A Practical guide to global illumination using ray tracing and photon mapping", International Conference on Computer Graphics and Interactive Techniques, Jul. 5, 2010 (Jul. 5, 2010), pp. 1-71, XP002589854, Retrieved the whole document from the Internet: URL:http://portal.acm.org/citation.cfm?id=1103920 [retrieved on Jul. 10, 2016].

Anders Kristensen, et al.: "Efficient Unbiased Rendering using Enlightened Local Path Sampling", Kongens Lyngby, Jan. 1, 2011 (Jan. 1, 2011), XP055287479, Retrieved the whole document from the Internet: URL:http://orbit.dtu.dk/ws/filed/51112612/phd240_awk_vers2.pdf [retrieved on Jul. 11, 2016].

European Patent Office—International Search Report of the International Searching Authority for International Application No. PCT/EP2016/074788 dated Jul. 24, 2017, 4 pgs.

European Patent Office—Written Opinion of the International Searching Authority for International Application No. PCT/EP2016/074788 dated Jul. 24, 2017, 9 pgs.

* cited by examiner

METHOD FOR MODELING AT LEAST ONE LIGHT SOURCE

CROSS-REFERENCE TO RELATED APPLICATIONS

This application is a U.S. National Phase entry under 35 U.S.C. § 371 of International Application No. PCT/EP2016/074788, filed Oct. 14, 2016, entitled "METHOD FOR MODELING AT LEAST ONE LIGHT SOURCE", and this application claims the benefit of priority to this international application.

TECHNICAL DOMAIN OF THE INVENTION

The present invention concerns the domain of modeling light sources. More particularly, but not exclusively, the present invention concerns the domain of design and simulation of primary light sources for use in three-dimensional (3D) environments, for example to obtain photometric or colorimetric data, or restoration of synthesized images from complex virtual systems modeled in 3D and comprising such light sources.

More particularly, the invention concerns a computer-implemented method for modeling at least one light source. The present invention also concerns a computer program comprising instructions for the execution of such a modeling method, as well as a method of manufacturing a luminous element comprising at least one light source modeled according to such a modeling method.

PRIOR ART

Methods are known for modeling a light source by computer wherein the light source is treated as a virtual 3D system emitting a field of light, said field of light constituting a particular type of emission field of electromagnetic waves. In image synthesis, for a fixed observer, this virtual 3D system can be represented by an image that corresponds to the part of the light field emitted by this 3D system and reaching the eye of the observer. Such methods make it possible to model any type of light source, particularly primary light sources.

Such a method of modeling a light source is described in document US 2003/0011596 A1. In this document, the light source is a secondary light source composed of a lighted object. The method described in this document comprises a step wherein the computer receives input data comprised of data representing a light field emitted by the light source, and a step of preparing a data model representing the light source from the input data received by the computer. The data model is formed from a set of images. In such a modeling method, only the result obtained in terms of light rendering is incorporated into the data model representing the light source. Moreover, the method described in this document comprises a step of storing the data model in the computer memory.

However, inserting this type of model into another model with 3D geometry presents problems of overlap between the images from the source model and the geometry of the 3D model, along with problems of positioning and orientation of the model from the source relative to the geometry. Moreover, in a computer simulation of the visual rendering of the light source in a virtual system, such a modeling method does not allow the light returning to the source to be taken into account, particularly the light returning due to optical reflection onto the auxiliary elements of the system.

To remedy this drawback, modeling methods similar to the method described in document US 2003/0011596 A1 have been developed, but the input data received by the computer also comprises modeling similar to a BRDF (Bidirectional Reflectance Distribution Function) for each direction of the light source.

However, in such modeling methods the volume of data to be processed is very high, and the modeling dynamics are reduced. Moreover, such modeling methods only allow the light returning to the light source to be taken into account as a secondary light source composed of a lighted opaque object. The properties of the secondary light source are limited to specular or diffuse reflection, and then only on the outer envelope of the source.

Other modeling methods similar to the one described in document US 2003/0011596 A1 have been developed wherein the input data received by the computer also comprises geometric data describing the light source. The geometric data defines a plurality of additional surfaces of the light source to be modeled. During the step in which the computer prepares the data model representing the light source, the light field emitted by the light source is locally reconstructed on the surfaces of the geometric data.

However, in such modeling methods problems of interpolation and overlap appear between the viewpoints of the set of images.

DESCRIPTION OF THE INVENTION

The invention seeks to remedy all or part of the disadvantages of the prior art identified above, and seeks particularly to propose a method of modeling at least one source of light, allowing any type of light source to be modeled, and to take into account the light returning to the source irrespective of the nature of said source, while reducing the volume of data to be processed without creating interpolation and overlap problems.

This objective is achieved with a computer-implemented method for modeling at least one light source, the computer comprising processing means and memory means for storing an application which, when executed by processing means, implements the method, the method comprising:

a reception step of receiving input data by processing means comprising data that includes characteristics of the materials that compose the light source; and a development step of preparing, using processing means, from the data of characteristics of the materials received as well as geometric data stored in the computer memory means and data containing characteristics of light emission from the light source stored in the computer memory means, of typical data representative of a light field emitted by the light source, of a data model representing the light source, said geometric data describing the light source, and defining a plurality of volumes and surfaces; wherein, during development of the data model:

the data of characteristics of materials is linked to the volumes and the surfaces of the geometric data; and the data of characteristics of light emission from the light source is linked to the surfaces of the geometric data;

a memory storage step by processing means in the data model in the memory means of the computer Due to the geometric data describing the light source and associated with the materials characteristics data forming the light source, the modeling method permits inclusion of the light returning to the light source during a computer simulation irrespective of the type of source.

Moreover, as a result of linking the material characteristics data to the volumes and surfaces of the geometric data as well as linking the light emission characteristics data to the surfaces of the geometric data, the volume of data to be processed is advantageously reduced. The modeling method according to the invention thereby reduces consumption of computer resources resulting in a reduction in processing time. This is particularly advantageous in simulation applications, particularly real-time computer simulation of the light source. In each new simulation using the light source modeled thus, recalculating the emission parameters of the photons or light waves from the source is not necessary, nor does the propagation of said photons or said waves towards the exterior of the source have to be recalculated. An increase in performance is thereby achieved in simulations using the said source.

Furthermore, when the light source is a primary light source, this method advantageously takes into account the optical properties of intrinsic emission and the characteristics of emission and light transmission of the elements comprising the primary light source. The behavior of the light source thus modeled by this modeling process can be simulated both in "active" mode, i.e. when the light source intrinsically emits light, as well as in "passive" mode, i.e. when the light returns to the light source whether it is lighted or extinguished.

Moreover, the method of modeling at least one light source according to the invention allows for faster emission of virtual photons.

Advantageously, the method further comprises a step of applying a surface tessellation algorithm, previously stored in the memory means of the computer, to the geometric data describing the light source.

This characteristic enables further reduction in the volume of data to be processed and facilitates the step of developing the data model that represents the light source while retaining precision of modeling the light fields both near and distant from the light source.

Preferably, the geometric data describing the light source is non-native geometric data.

Thus, such a method advantageously makes it possible to provide a light source model independent of the software used for the 3D geometric design of the source and independent of any simulation software. It is therefore possible to model the source geometrically only once in one of the existing software programs and to then make it available automatically digitized for all other software programs, with no interoperability problem between software programs. Thus, the light source model can be incorporated into a layout of a computer-assisted design software program, just like any other component for such a software program. The method according to the invention advantageously provides an inter-software data model, representing the light source.

According to a particular embodiment of the invention, the input data received by the processing means also comprises native geometric data describing the light source, and the method further comprises an additional step using computer processing of transforming the native geometric data received into non-native geometric data, said non-native geometric data being stored in the computer memory means and at least in part supplying the non-native geometric data used in the data model preparation step.

According to another particular embodiment, the input data received by the processing means comprises the non-native geometric data describing the light source, the method further comprising an additional step of storing non-native geometric data in the computer memory means.

According to another particular embodiment, the input data received by the processing means also comprises data of intrinsic emission characteristics of the light source, the method further comprising an additional step, using computer processing means, of transforming data of intrinsic emission characteristics of the light source into data with light emission characteristics, said light emission characteristics data being stored in the memory means of the computer and supplying the light emission characteristics during the data model preparation step.

Advantageously, the additional transformation step consists of implementing an algorithm for direct, indirect or bidirectional simulation of light rays propagation onto the intrinsic emission characteristics of the light source.

According to another particular embodiment, the input data received by the processing means comprises the light emission characteristics data, and the method further comprises an additional step of storing light emission characteristics data in the computer storage means.

Advantageously, the transformation step comprises the implementation, on the native geometric data received, of a surface tessellation algorithm previously stored in the memory means of the computer; the outer surfaces of the non-native geometric data obtained on completion of the transformation step.

This characteristic makes it possible to further reduce the volume of data to be processed and to facilitate the data model preparation step representing the light source, retaining in the modeling precision of the light fields near to and distant from the light source.

Advantageously, during the step of preparing the data model, light emission characteristics data from the light source is linked to the outer surfaces of the geometric data by tessellation of the said surfaces.

Said characteristics facilitate implementation of the step of preparing the data model, particularly when the input data is physical parameter measurement data related to a real light source.

Advantageously, during the development step of the data model, linking the data of light emission characteristics of the light source to the tessellated surfaces of the geometric data is obtained by implementing—on said light emission characteristics data and on the materials characteristics data linked to the volumes and surfaces of the geometric data—a data projection algorithm, said algorithm being previously stored in the computer memory means.

According to a particular embodiment of the invention, the surfaces of the non-native geometric data describing the light source are NURBs (Non-Uniform Rational Basis Splines).

According to a particular technical characteristic of the invention, the data of light emission characteristics of the light source comprises data representing an emittance, and/or data representing an intensity distribution, and/or data representing a luminance, and/or data representing a spectral emission from the light source.

Advantageously, the data of light emission characteristics of the light source comprises data representing a spectral emission of the light source, said data representing a spectral emission shown in the form of a multi-chrome model or spectral model. The multi-chrome model may be an XYZ type of model.

These characteristics make it possible to improve the colorimetric precision relative to the modeled light source, taking into account the actual emission spectrum of the light source, while further reducing the volume of data to be processed based on the sampling chosen by a user.

Advantageously, the method further comprises at least one additional post-processing step of the data model, by processing means, among the group of steps consisting of: a step of comparison to a threshold, a filtering step, a zoning step, an association step, a step of recognition of sampled data, an encryption step and a compression step.

This characteristic makes it possible to control the volume and noise of the data to be processed relative to the precision desired by a user.

Advantageously, the method further comprises an additional step of applying static or dynamic textures of single or high dynamic value, during which the textures are linked to the surfaces of the geometric data describing the light source, the data of light emission characteristics from the light source being linked to the textures during the data model development step.

These characteristics advantageously enable a light source such as a cathode ray screen or liquid crystal screen to be modeled. In this case, each texture represents an image displayed on the screen when the screen is illuminated, and this image is linked to a flat or curved region that represents the display region on the screen. Moreover, using dynamic textures further allows a dynamic data model to be obtained, i.e. evolving over time.

Advantageously, at least two light sources are modeled; the geometric data, the data of characteristics of materials and the data of characteristics of light emission are different data for each modeled light source; and at least two different data models, each representing one of the light sources, are stored in the computer memory means.

During simulation of a system using light sources thus modeled, these characteristics allow post-processing of the "mixing table" of sources, without the need, for each addition of a new source, to simulate the system again with the sources already added. These characteristics also offer increased scalability to a complex virtual system comprising these light sources. For example, it is possible to easily model a light emitting diode or a group of light emitting diodes in a vehicle lamp, as well as other different light sources located in the lamp, each corresponding to a function of the lamp such as the low-beam function, the position function, high beam, stop, flashers, backup, etc. It is also possible to easily model a light guide comprising a plurality of light sources.

Advantageously, all or part of the input data received during the input data receiving step is data obtained by a prior measurement of physical parameters relative to a real light source corresponding to the light to be modeled.

This characteristic makes it possible to improve precision of the data received during the input data receiving step and therefore to improve the precision of the modeling of the light source or of each light source.

Advantageously, the method further comprises a step of measuring light emission characteristics of the envelope of an actual light source corresponding to the light source to be modeled, the measured data forming the data of light emission characteristics of the light source, the input data further comprising the data of light emission characteristics of the light source; and a step of storing data of light emission characteristics of the light source in the computer memory means.

The invention also relates to a computer program product that can be downloaded from a communication network and/or recorded on a medium that can be read by computer and/or executed by a processor, and comprising program instructions for implementing the method as described above when the program product is executed on a computer.

The invention also relates to a method of manufacturing a luminous element comprising at least one light source, the manufacturing method comprising a sub-method of modeling as described above, the at least one light source being modeled according to the sub-method of modeling. Such a luminous element can be a light guide, a lighted instrument display, or a lamp of a vehicle or an aircraft.

As a result of the reduction in processing time offered by the modeling sub-method according to the invention and the improved real-time simulation performance of the light source(s) it allows as a consequence, the manufacturer implementing the manufacturing method hereinabove described can advantageously perform a large number of virtual experiments while preserving a high level of modeling and simulation precision. The invention advantageously eliminates the need for the expensive and time-consuming manufacture of physical prototypes before manufacturing the luminous element itself. For example, such a manufacturer can display in real time and in virtual reality long light guides placed in a vehicle passenger compartment that produce a particular luminous ambiance, thereby verifying that the quality perceived is correct from any of the viewpoints. To do this, the manufacturer has no need to produce physical prototypes.

Definitions

Native data: data specific to a given software or firmware.
Non-native data: data not specific to a given software or firmware.
Primary light source: light source capable of intrinsically emitting light.
Secondary light source: light source capable of reflecting or diffusing at least part of the light it receives from a primary or secondary source.
Surface tessellation: partition of a space, generally a Euclidean space such as a plane or a three-dimensional space, into regular base elements.
Direct simulation: simulation in which the rays are emitted from the light sources and propagated according to the geometries encountered and the optical properties of the volumes and surfaces of said geometries.
Indirect simulation: simulation in which the rays are emitted from a camera type sensor and propagated according to the geometries encountered and the optical properties of the volume and surfaces of said geometries, the rays encountering light sources during their propagation being able to get luminous information in the pixel from the sensor where they were initially generated.
Bidirectional simulation: simulation in which photons are used that are propagated in both directions according to the definition given for direct and indirect simulations.

BRIEF DESCRIPTION OF THE FIGURES

Other characteristics and advantages of the invention will be seen from the following description, with reference to the appended figures wherein.

In the following description, "computer" is understood as including but not limited to any electronic device having at least processing means and memory storage means, i.e. an office computer, a portable computer, a wireless communication device such as a smart phone, or a digital tablet.

For greater clarity, identical or similar elements are referenced by identical reference signs on all the figures.

Embodiments

Notably disclosed in the following is a method of modeling at least one light source 2.

The light source 2 is advantageously a primary light source, i.e. an incandescent or compact fluorescent light source; a source of light emitting diodes, notably those comprising diffusing and fluorescent materials; a light guide, or a liquid crystal screen (LCD).

However, the modeling method according to the invention can be extended to other types of light sources such as secondary light sources.

Figure 1:
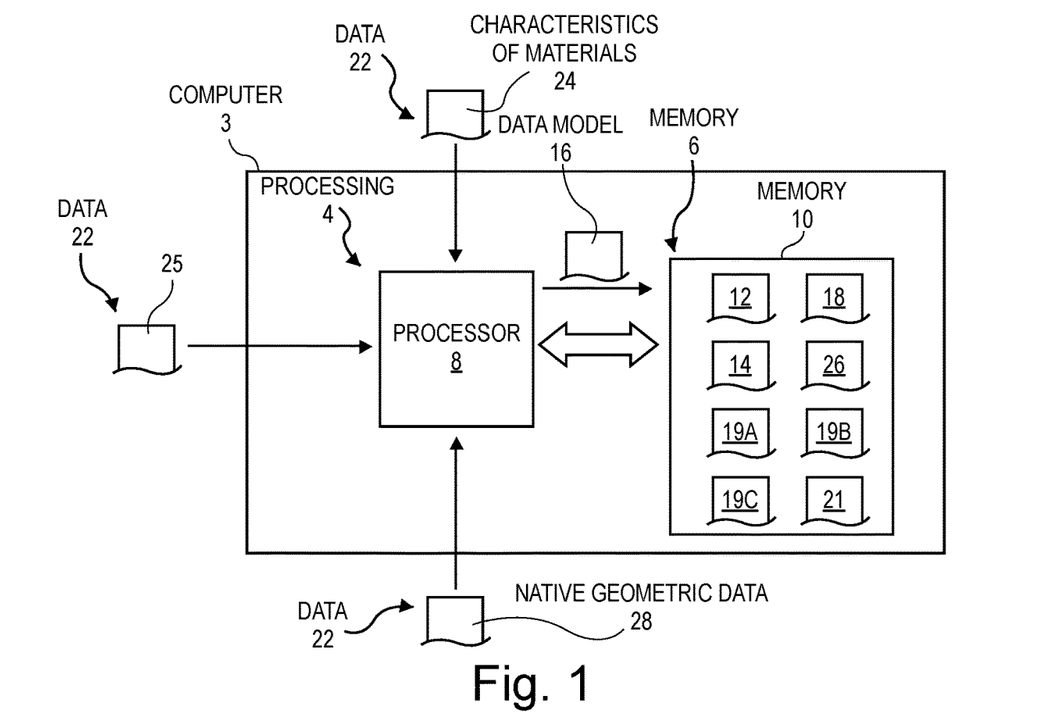
FIG. 1 is a schematic and functional representation of a computer comprising a memory, the memory storing an application for implementing the method of modeling at least one light source according to the invention.

A computer 3 is represented schematically and functionally in FIG. 1.

The computer 3 comprises processing means 4 and memory storage means 6 connected to the processing means 4. The processing means 4 comprises at least one processor 8, and the memory storage means 6 comprises at least one memory 10, for example non-transient memory. In the embodiment of FIG. 1, the processing means 4 comprises a single processor 8, and the memory storage means 6 comprises a single memory 10 of the non-transient memory type.

Figure 4:
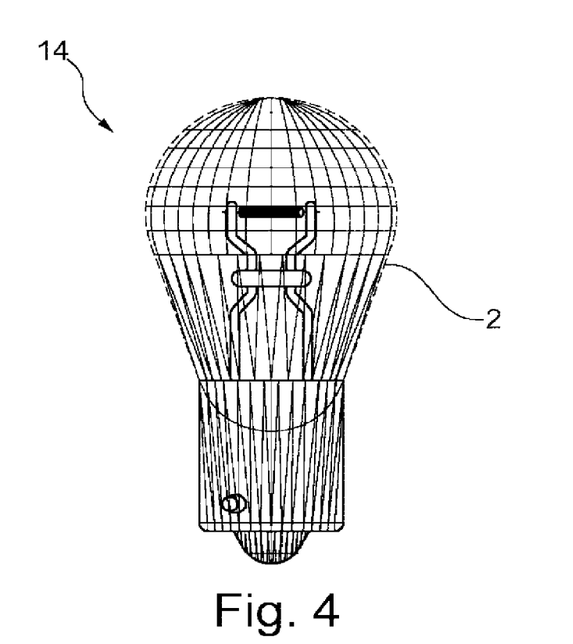

The memory 10 stores an application 12, geometric data 14 describing the light source 2, and data 26 of light emission characteristics of the light source 2. The geometric data 14 defines a plurality of volumes and surfaces, as illustrated in FIG. 4 and as described in more detail below. Preferably, the geometric data 14 is non-native data. The memory 10 is suitable for storing a data model 16 representing the light source 2. In the particular embodiment of FIG. 1, the memory 10 further comprises a surface tessellation algorithm 18, an algorithm 19A for direct simulation of light rays propagation, and/or an algorithm 19B for indirect simulation of light rays propagation and/or an algorithm 19C for bidirectional simulation of light rays propagation. In this particular embodiment, the memory 10 further comprises a data projection algorithm 21.

For example, application 12 is an application that can be downloaded from a data communications network via a download platform not shown in the figures. The application 12 includes program instructions suitable for implementing the method of modeling at least one light source 2 according to the invention, as described below.

Figure 2:
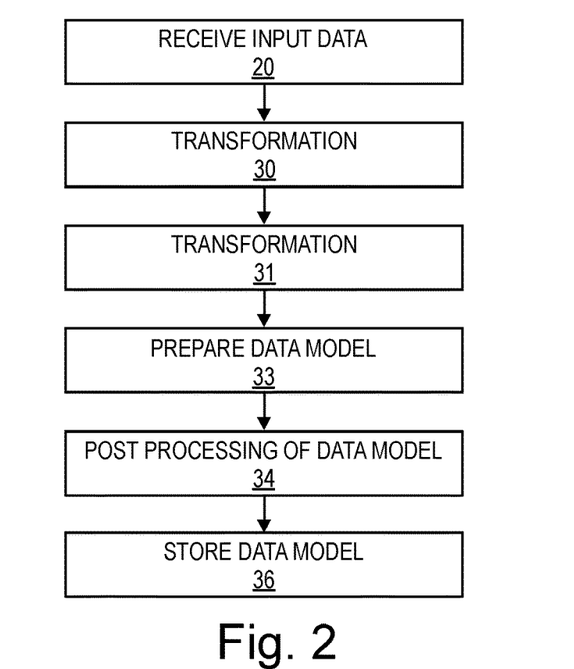
FIG. 2 is a flowchart showing a method of modeling at least one light source according to the invention, the method being implemented by the application of FIG. 1.

The method of modeling at least one light source 2 implemented by the computer 3 will now be described in detail, with reference to FIG. 2 considered with FIG. 1 and FIGS. 3 to 5. The application 12 was initially executed by processing means 4.

During a previous step 20, the processing means 4 receives input data 22. The input data 22 comprises materials characteristics data 24 of the elements constituting the light source 2. In the particular embodiment illustrated in FIG. 1, the input data 22 also comprises the data 25 containing intrinsic emission characteristics of the light source. According to this particular embodiment, the geometric data 14 is non-native data, and the input data 22 also comprises native geometric data 28 describing the light source 2.

According to another particular embodiment, not illustrated in the figures, the input data 22 does not comprise native geometric data 28, but instead comprises non-native geometric data describing the light source 2. According to this particular embodiment, the method further comprises an additional step of storing non-native geometric data 14 in the memory storage means 6 of the computer 3. Preferably, according to this particular embodiment, the method further comprises an additional step of applying the surface tessellation algorithm 18 to the non-native geometric data 14 describing the light source 2. More specifically, the processing means 4 of the computer 3 executes the surface tessellation algorithm 18 on the non-native geometric data 14, thus furnishing tessellated geometric data 14.

According to another particular embodiment, not illustrated in the figures, the input data 22 also comprises native geometric data describing the light source 2, said native geometric data furnishing the geometric data 14. According to this particular embodiment, the method further comprises an additional step of storing native geometric data 14 in the computer 3 memory storage means 6. Preferably, according to this particular embodiment, the method further comprises an additional step of applying the surface tessellation algorithm 18 to the native geometric data 14 describing the light source 2. More specifically, the computer 3 processing means 4 executes the surface tessellation algorithm 18 on the native geometric data 14, thus providing tessellated geometric data 14.

According to another particular embodiment, not illustrated in the figures, the input data 22 does not comprise data 25 of intrinsic emission characteristics of the light source 2, but instead comprises the data 26 of light emission characteristics of the light source 2. According to this particular embodiment, the data 26 of light emission characteristics of the light source 2 is obtained from a prior measurement of the light emission characteristics of the envelope of a real light source corresponding to the light source 2 to be modeled. The prior measurement of the said light emission characteristics may be performed by means of a goniophotometer, camera grid, or miniaturized or compact cameras. According to this particular embodiment, the method further comprises an additional step of storing data 26 of light emission characteristics of the light source 2 in the memory storage means 6 of the computer 3.

Advantageously, all or part of the input data 22 is data obtained by a prior measurement of physical parameters relative to a real light source corresponding to the light source 2 to be modeled. For example, the data 25 of intrinsic light emission characteristics of the light source 2 can be obtained from a prior measurement of the intrinsic emission characteristics of a real light source corresponding to the light source 2 to be modeled. Alternatively, all or part of the input data 22 can be obtained by a previous simulation performed in a computer, for example in the computer 3. Thus, the input data 22 can either come from a source outside the computer 3, as illustrated in FIG. 1, or from a part or a subassembly of the computer 3 itself.

The data 24 of characteristics of materials of which the light source 2 is formed comprise data of characteristics of materials forming the inner and/or outer surfaces of the light source 2, and/or of the data of characteristics of materials filling the volume inside the light source 2. For purely illustrative purposes and not limiting the invention to this application, the data 24 of characteristics of materials forming an incandescent lamp can comprise characteristics relative to the surfaces of an emissive element formed by a tungsten filament, just like characteristics relative to the lamp bulb material, generally glass.

Moreover, the optical properties of the surfaces, like the volume of all of the constituent elements of the light source 2 to be modeled, are contained in the data 24 of characteristics of materials forming the source 2. Consequently, in a case where the light source 2 to be modeled is a primary light source, the optical properties of all of the emissive elements of the source 2 are contained in the data 24 of characteristics of materials forming the said source 2.

The data 24 of characteristics of materials forming the light source 2 is data provided by the manufacturers of light sources or measured data, although the invention is not limited to these embodiments.

As an illustrative and non-limiting example, the data 25 of intrinsic emission characteristics of a light source such as an incandescent lamp can comprise emission characteristics related to the luminous emission of an emissivity element of the lamp formed by a tungsten filament.

The data 26 of luminous emission characteristics of the light source 2 is representative of data representing a luminous field emitted by the light source 2. The data 26 of light emission characteristics of the light source 2 comprises data representing an emittance, and/or data representing an intensity distribution, and/or data representing a luminance, and/or data representing a spectral emission from the light source.

If the data 26 with light emission characteristics comprises data representing a spectral emission from the light source, said data can advantageously be represented in the form of a multi-chrome model or even a spectral model. The data representing a spectral emission from the light source can be represented in the form of an XYZ type multi-chrome model. As a variant, an RGB type model (Red Green Blue) can be used, but will provide less colorimetric precision. In a case of representation of data representing a spectral emission in the form of a spectral model, the spectral model is preferably sampled. More preferably, the number of samples used is a parameter that can be set by a user. This advantageously allows the user to control the precision level of the sampling.

The light emission characteristics data 26 is digital data. Preferably, in order to preserve a high dynamic for modeling the light source 2, the values of the data 26 of light emission characteristics are in the form of floating decimal numbers in single precision format, in accordance with the IEEE 754 standard; in other words, the values of the data 26 are represented by four bytes. However, any other form of digital data coding can be used.

The native geometric data 28 describing the light source 2 is simulation data produced by a computer-assisted design software program or a 3D conceptual design software program. The native geometric data 28 describing a particular light source such as an incandescent lamp 2 is illustrated in the specific example of FIG. 3.

According to the particular embodiment illustrated in FIG. 1, the modeling method comprises a subsequent step 30 in which the processing means 4 of the computer 3 transforms the native geometric data 28 received into non-geometric data 14. The non-geometric data 14 thus obtained is digital data. Said non-native geometric data 14 describing the light source 2 is then stored in computer 3 memory storage means 6.

Figure 5:
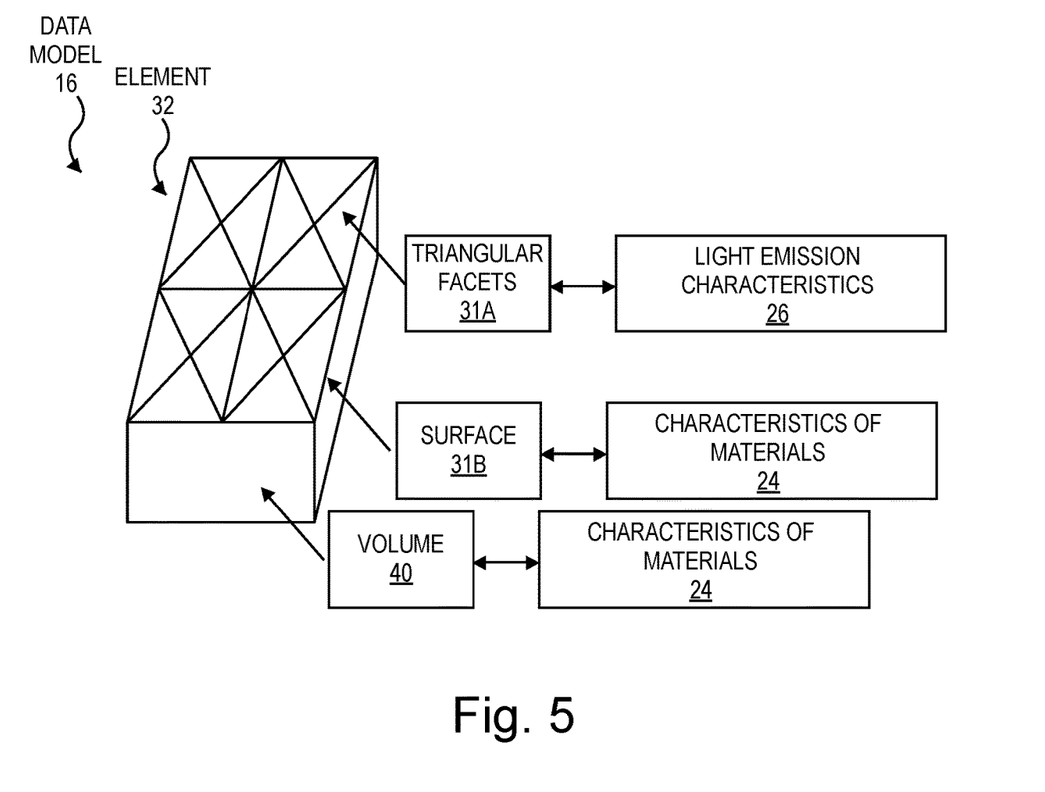
FIG. 5 is a schematic representation of a part of a data model showing a light source modeled by the modeling method in FIG. 2 according to a particular embodiment of the invention.

Preferably, the transformation step 30 comprises the implementation of the surface tessellation algorithm 18 on the native geometric data 28 received. More specifically, the processing means 4 of the computer 3 executes the surface tessellation algorithm 18 on the native geometric data 28 during the transformation step 30. The surface tessellation of the native geometric data 28 consists of a mesh of triangular facets 31A, as illustrated in FIG. 5. FIG. 5, which represents an element 32 of the light source 2 obtained upon completion of the transformation step 30, and having an "Element 32-Volume 40-Surface 31B-Facet 31A" tree structure, will be described in more detail below.

Upon completion of the said transformation step 30, at least the outer surfaces of the non-native geometric data 14 are obtained by surface tessellation of the native geometric data 28. In a particular embodiment, illustrated in FIG. 4, all the surfaces and all the volumes defined by the non-native geometric data 14 are obtained by surface tessellation of the native geometric data 28.

Figure 3:
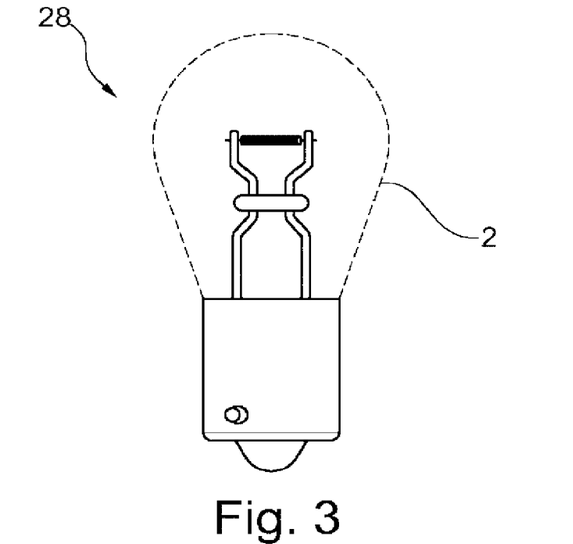
FIGS. 3 and 4 are schematic representations of geometric data, native and non-native respectively, describing a light source and illustrating a particular step of the modeling method of FIG. 2.

Represented in FIGS. 3 and 4, respectively, are native geometric data 28 and non-native geometric data 14 describing a particular light source such as an incandescent lamp 2 corresponding to the implementation of the surface tessellation algorithm 18.

Preferably, the parameters of the surface tessellation, such as for example those found in the 3D design software such as deflection, length of sides of the facets, angular deviation between the perpendiculars to the apexes of the facets and the perpendicular to the facet, are parameters that can be set by a user. Advantageously this enables the user to control the volume and precision of the data to be processed as related to the precision and quality of the desired mesh and modeling, and relative to the tessellation processing time.

According to the particular embodiment in which the input data 22 does not comprise native geometric data 28, but instead comprises non-native geometric data 14 describing the light source 2, at least the outer surfaces of the non-geometric data 14 received can be previously tessellated surfaces.

According to a particular embodiment of the invention, not shown in the figures, the surfaces of the non-native geometric data 14 describing the light source are NURBs (Non-Uniform Rational Basis Splines). According to this embodiment, two variants are possible: a first variant in which the input data comprises native geometric data 28 and the modeling method comprises an additional step 30 during which the processing means 4 of the computer 3 transforms the surfaces of the native geometric data 28 received as NURBS surfaces, thus obtaining the surfaces of the non-native geometric data 14; and a second variant in which the input data 22 does not comprise native geometric data 28 but instead comprises non-native geometric data 14 describing the light source 2, and the surfaces of these non-native geometric data are NURBS surfaces.

Preferably, for the first variant, a sampling of the coordinates of the NURBS surfaces is performed by the processing means 4 during the transformation step. More preferably, the sampling parameters are parameters that can be set by a user. Advantageously this enables the user to control the volume and precision of the data to be processed compared to the desired precision and processing time. For example, the greater the number of samples desired by the user, the better the precision of the modeling.

According to the particular embodiment illustrated in FIG. 1, the modeling method comprises a next step 31 during which the processing means 4 of the computer 3 transforms the data 25 of intrinsic emission characteristics of the light source 2 into data 26 of light emission characteristics, via implementation of an algorithm 19A, 19B, 19C, for direct, indirect or bidirectional simulation of light rays propagation. Said light emission characteristics data 26 is then stored in the computer 3 memory storage means 6.

The implementation of the algorithm 19A for direct simulation of light rays propagation consists of the emission of virtual photons from the light source 2 according to the intrinsic emission characteristics 25 thereof, then in the propagation thereof according to a rays-tracing algorithm using the characteristics of materials of the constituent elements of the light source.

The implementation of algorithm 19B for indirect simulation of light rays propagation consists of the emission of rays from a fixed observer, then the propagation thereof according to a rays-tracing algorithm. The fixed observer is a camera that observes the light source 2 from different directions. The result of such indirect simulation is a set of high-dynamic spectral images and a detailed path of photons. The values of the data representing a luminance are values taken from any viewpoint in the direction of any point of the light source 2.

Implementation of the algorithm 19C for bidirectional simulation consists of a mixture of the photons propagation principles explained above in relation to algorithms 19A, 19B for direct and indirect simulation.

As a variant, steps 30 and 31 can be performed simultaneously.

During the next step 33, the processing means 4 prepares a data model 16 representing the light source 2 from data 24 of characteristics of materials received, as well as geometric data 14 and data 26 from light emission characteristics stored in memory means 6. In the particular embodiment of FIG. 1 according to which the computer 3 processing means 4 transforms the native geometric data 28 received into non-native geometric data 14, said non-native geometric data obtained from native geometric data provides at least part of the geometric data 14 used during said step 33.

During the step 33 of preparing a data model 16, the data 24 of characteristics of materials is linked to the volumes and surfaces of the geometric data 14, and the data 26 of light emission characteristics of the light source is linked to the surfaces of the geometric data 14.

Preferably, when the geometric data 14 is tessellated data, the data of light emission characteristics 26 is linked to the outer surfaces of the geometric data 14 using the tessellation of the said surfaces.

More specifically, in a particular embodiment of the invention, said linking is achieved via the implementation of the data projection algorithm 21, by the computer 3 processing means 4 on the data of light emission characteristics 26 and on the data 24 of characteristics of materials linked to volume and surfaces of the tessellated geometric data 14.

Implementation of the data projection algorithm 21 consists of projecting the projection of light emission characteristics data 26 onto the geometric data 14 linked to the material characteristics data 24. For example, in a case where the data 26 of light emission characteristics is obtained by the implementing the direct simulation algorithm 19A onto the data 25 of intrinsic emission characteristics of the light source, the data 26 is emerging rays located immediately at the output of the light source envelope. The position of the emerging rays is perfectly known with the coordinates of the point of intersection on the output facet. The data of each ray can therefore be used to calculate the emittance of the associated facet. The direction of the emerging rays is also perfectly known and the data of each ray can therefore be incorporated into an intensity distribution linked to the corresponding facet, as detailed below.

Several alternatives are then possible within the scope of the present invention:

- either the photons are preserved and are linked to the surfaces of the tessellated geometric data 14. A sort of cartography of photons is thus obtained, and the data of light emission characteristics 26 is in this case the photons themselves.
- or the photons are incorporated in digital models, preferably sampled. The digital models are then linked to the surfaces of the tessellated geometric data 14. Preferably, the sampling parameters, such as the spatial resolution for the emittance data, the angular resolution for intensity distribution data or the chromic or spectral resolution for data representing a spectral emission, are parameters that can be set by a user. Several possibilities can then be considered:
    - either an intensity distribution per facet 31A is obtained, each facet 31A having a constant emittance. More specifically, in this case the number of rays leaving each facet 31A is counted, and, knowing the luminous intensity of the light source 2, the processing means 4 deduces therefrom the emittance of the facet. The fact of having a constant emittance per facet makes it possible to have rather fine control of the resolution of the mesh from tessellation, and can thus furnish a spatial precision parameter of the data model 16. The preferred embodiment as concerns the representation of the intensity distribution for each facet 31A is to use either a sampled polar distribution, or an octahedron that is refined to have better precision, or an analytical model. Preferably, the parameters of the representation used for the intensity distribution are parameters that can be set by a user.
    - or an intensity distribution and a variable emittance per facet 31A are obtained. Said variable emittance can be modeled in the form of a static or dynamic texture, and the intensity distribution in this case is preferably given per pixel of the texture. In this case, the modeling method further comprises an additional step not shown in the figures, during which the static or dynamic textures are linked to the tessellated outer surfaces of the geometric data 14. The light emission characteristics data 26 is then linked to the textures, for example to the pixels of said textures, during step 33 of preparing the data model 16. Each static texture can be a two-dimensional texture that can be in the form of a low or high dynamic texture, a spectral texture, a multi-chromic texture, XYZ type, or a gray levels texture. The dynamic textures used can be videos. The preferred embodiment concerning the representation of the intensity distribution for each facet 31A is to use either a sampled polar distribution, or an octahedron that is refined to have better precision, or an analytical model. Preferably, the parameters of the representation used for the intensity distribution are parameters that can be set by a user.

According to a particular embodiment, the emittance and intensity distribution can be replaced by a luminance for one viewpoint or a plurality of luminance is for a plurality of viewpoints.

The fact of using high dynamic static textures advantageously makes it possible to increase the precision of the photometric or colorimetric results and to increase the quality of the synthetic images generated by a simulation implementing the light source 2 thus modeled.

In this particular embodiment of the invention implementing the data projection algorithm 21, several alternatives are possible for the best preservation of the data representing a spectral emission:

- either overall color information is preserved for all of the light source 2;
- or color information is linked to each facet 31A obtained upon completion of the tessellation of the geometric data;
- or color information is linked to each facet 31A and to each direction.

During step 33 of preparing the data model 16, other additional data can advantageously be linked to the geometric data 14 in order to enable standardization of the simulation results, utilizing this source model or the placement and orientation of this source model in a 3D environment. Such additional data may comprise data representing the luminous intensity of the source 2, or possibly one or more axes to allow the positioning and orientation of the light source 2 when it is inserted into a more complex virtual system.

In any event, in the preferred embodiment according to which the processing means 4 implements a surface tessellation step with the native geometric data received 28, upon completion of step 33 of preparing the data model 16, tessellated non-native geometric data 14 is obtained, as well as data 24 of materials characteristics of materials linked to the volume and surfaces of the non-native geometric data 14, and, for each facet of the tessellated non-native data 14, data 26 of light emission characteristics linked to the facet and representing the light emission of said facet. According to this preferred embodiment of the invention, FIG. 5 represents part of the data model 16 obtained upon completion of step 33. This part of the data model 16 comprises an element 32 of the light source obtained by the surface tessellation of the native geometric data 28. The element 32 thus constitutes part of the tessellated non-native geometric data 14 obtained upon completion of the surface tessellation step. As illustrated in FIG. 5, upon completion of the step 33 of preparing the data model 16, data 24 from the characteristics of the materials is linked to the volume 40 defined by the element 32 of other data 24 of characteristics of materials is linked to the surfaces 31B defined by the element 32, and light emission characteristics 26 is linked to the facets 31A defined by the element 32. In the FIG. 5 illustration, the data 26 from the light emission characteristics of the light source may comprise data representing an emittance associated with data representing an intensity distribution, or data representing a luminance, and data representing a spectral emission.

Preferably, the modeling method comprises a next step 34 during which the processing means 4 of the computer 3 performs a post-processing of the data model 16. The post-processing of the data model 16 may consist of comparison to a threshold, filtering, zoning, association, recognition of sampled data, and encryption of all data in the data model, or compression of certain data from the data model.

Post-processing by comparison to a threshold, in the preferred embodiment according to which the processing means 4 implements a surface tessellation step, may consist in which all the facets 31A to which are linked a quantity of data of light emission characteristics less than a predefined threshold are defined as non-emissive or constant facets. Post-processing by comparison to a threshold advantageously makes it possible to control the volume of data to be processed relative to the precision of the desired modeling.

Post-processing filtering can be particularly suited to the special case of implementating one of algorithms 19A, 19B, 19C for direct, indirect or bidirectional simulation of light rays propagation during step 33 of preparing the data model 16. Post-processing filtering type advantageously makes it possible to control the volume of data to be processed relative to the precision of the desired modeling.

In the preferred embodiment according to which the processing means 4 implements a surface tessellation step, zoning post-processing can group together the facets 31A having similar emittance values, rather than continuing to link an emittance value to a facet 31A. Post-processing zoning type advantageously controls the volume of data to be processed relative to the modeling precision desired.

Post-processing association type may, in the preferred embodiment according to which the processing means 4 implement a surface tessellation step, consist of grouping together certain data representing an intensity distribution and/or certain data representing a spectral emission that would be similar based on certain predefined criteria. Instead of storing this data directly onto facets 31A, the data is then stored in tables, facets 31A pointing to these tables so that a plurality of facets 31A can point to the same tables. Association post-processing provides great flexibility to the prepared data model 16, while making it possible to reduce the volume of data to be processed.

Encryption post-processing may consist of encrypting all of the data of the data model 16, access to the encrypted model such as through a programming interface that provides access only to the information required for use of the model in the design or 3D simulation software. Encryption post-processing allows a user of such a design or 3D simulation software, i.e. an integrator, to be able to use the encrypted model without having access to the content of that model, in particular the design details of the light source that are specific to the manufacturer. For simulation software using the source 2 thus modeled, the source will be seen as a black box capable of emitting rays or of giving the luminance value at any point and in any direction as a plenoptic function. Thus, this encryption step advantageously protects the design details specific to the manufacturer.

Compression post-processing may consist of implementating a compression algorithm on data representing an intensity distribution and/or data representing a spectral emission. Compression post-processing makes it possible to reduce the volume of data to be processed.

Recognition post-processing of the sampled data may consist of implementating an algorithm for processing the signal on sampled data in order to project them onto an analytical model or onto a model based on wavelet functions. Recognition post-processing of the sampled data makes it possible to reduce the volume of data to be processed.

During a final step 36, the processing means 4 stores in memory the data model 16 in the computer 3 memory means 6.

The invention has been illustrated and described in detail in the drawings and in the preceding description. It should be considered illustrative only and given by way of example, and not limiting the invention to this description alone. Numerous variants of embodiment are possible.

In particular, although the modeling method according to the invention has been described with reference to the modeling of a single source of light, the present invention extends also to the case of modeling a plurality of light sources. In particular, according to an embodiment of the invention not shown in the figures, at least two light sources 2 are modeled by the modeling method according to the invention. According to this particular embodiment, the geometric data, the data of characteristics of materials and the data of characteristics of light emission are different data for each modeled light source 2, and at least two different data models 16, each representing one of the light sources, are stored in the memory means of the computer.

The invention claimed is:

1. A process, implemented by computer, of modeling at least one light source, the computer comprising a processing system and memory for storing an application that, when executed by the processing system, implements a method, the method comprising:
receiving by the processing system, input data comprising data having characteristics of the materials composing the light source; and
preparing, by processing system, a data model representing the light source, the data model based on the data of characteristics of the materials received as well as geometric data stored in the memory of the computer, and data of characteristics of light emission from the light source that are stored in the memory of the computer, of typical data representative of a light field emitted by the light source, the geometric data describing the light source, and defining a plurality of volumes and surfaces; wherein, during creation of the data model:
the data of characteristics of materials is linked to the volumes and to the surfaces of the geometric data; and
the data of characteristics of light emission from the light source are linked to the surfaces of the geometric data;
storing in memory, by the processing system, the data model in the memory of the computer.

2. The process according to claim 1, further comprising applying a surface tessellation algorithm, previously stored in the memory of the computer, to the geometric data describing the light source.

3. The process according to claim 1, wherein the geometric data describing the light source is non-native geometric data which is geometric data that has been tessellated.

4. The process according to claim 3, wherein the input data received by the processing system also comprises native geometric data describing the light source, wherein the native geometric data is geometric data that has not been tessellated and the method further comprises a transformation, by the processing system of the computer, of the native geometric data received into non-native geometric data, the non-native geometric data being stored in the memory of the computer and supplying the non-native geometric data when preparing the data model.

5. The process according to claim 4, wherein the transformation comprises implementation, on the native geometric data received, of a surface tessellation algorithm previously stored in the memory of the computer; at least the outer surfaces of the non-native geometric data being obtained upon completion of the transformation.

6. The process according to claim 5, wherein, during the data model preparation step, the data of light emission characteristics from the light source is linked to the outer surfaces of the non-native geometric data by using the tessellation of said surfaces.

7. The process according to claim 6, wherein, during the preparation of the data model, the linking of the data of light emission characteristics of the light source to the tessellated surfaces of the geometric data is obtained by implementing a data projection algorithm onto the data of light emission characteristics and onto the data of characteristics of materials linked to the volumes and surfaces of the geometric data, the data projection algorithm being previously stored in the memory of the computer.

8. The process according to claim 7, wherein the data of light emission characteristics of the light source comprises data representing a spectral emission from the light source, said data representing a spectral emission being represented in the form of a multi-chromic model or spectral model.

9. The process according to claim 7, further comprising at least one additional post-processing, by the processing system, of the data model, among the group of one or more of: a comparison to a threshold, a filtering, a zoning, an association, a recognition of sampled data, an encryption and a compression.

10. The process according to claim 7, further comprising an additional step of applying static or dynamic textures of single or high dynamic value, during which the textures are linked to the surfaces of the geometric data describing the light source, the data of light emission characteristics from the light source being linked to the textures during the step of preparing a data model.

11. The process according to claim 7, wherein at least two light sources are modeled; wherein the geometric data, the data of characteristics of materials and the data of characteristics of light emission are different data for each modeled light source; and wherein at least two different data models, each representing one of the light sources, are stored in the memory of the computer.

12. The process according to claim 7, wherein all or part of the input data are data obtained by a prior measurement of physical parameters relative to a real light source corresponding to the light source to be modeled.

13. The process according to claim 7, further comprising measuring light emission characteristics of the envelope of an actual light source corresponding to the light source to be modeled, the measured data forming the data of light emission characteristics of the light source, the input data further comprising the data of light emission characteristics of the light source; and storing data of light emission characteristics of the light source in the memory of the computer.

14. A non-transitory machine readable medium storing executable program instructions which when executed by a data processing system cause the data processing system to perform a method of modeling at least one light source, the method comprising:
receiving, by the processing system, input data comprising data having characteristics of the materials composing the light source; and
preparing, by processing system, a data model representing the light source, the data model based on the data of characteristics of the materials received as well as geometric data stored in the memory of the computer, and data of characteristics of light emission from the light source that are stored in the memory of the computer, of typical data representative of a light field emitted by the light source, the geometric data describing the light source, and defining a plurality of volumes and surfaces; wherein, during creation of the data model:

the data of characteristics of materials is linked to the volumes and to the surfaces of the geometric data; and the data of characteristics of light emission from the light source are linked to the surfaces of the geometric data;

storing in memory, by the processing system, the data model in the memory of the computer.

15. A method for manufacturing a luminous element comprising at least one light source, the method comprising:

receiving, by the processing system, input data comprising data having characteristics of the materials composing the light source; and preparing, by processing system, a data model representing the light source, the data model based on the data of characteristics of the materials received as well as geometric data stored in the memory of the computer, and data of characteristics of light emission from the light source that are stored in the memory of the computer, of typical data representative of a light field emitted by the light source, the geometric data describing the light source, and defining a plurality of volumes and surfaces; wherein, during creation of the data model:

the data of characteristics of materials is linked to the volumes and to the surfaces of the geometric data; and the data of characteristics of light emission from the light source are linked to the surfaces of the geometric data;

storing in memory, by the processing system, the data model in the memory of the computer.

* * * * *